United States Patent
Bong et al.

(10) Patent No.: US 8,122,865 B2
(45) Date of Patent: Feb. 28, 2012

(54) INTAKE MANIFOLD FOR VEHICLE

(75) Inventors: Ha Dong Bong, Ansan-si (KR); Ja Un Ku, Suwon-si (KR); Nahm Roh Joo, Gunpo-si (KR); Seong Hyuk Kang, Hwaseong-si (KR); Su Ho Lee, Suwon-si (KR); Woo Tae Kim, Suwon-si (KR); Han Sang Kim, Ansan-si (KR); Hyun Il Park, Seongnam-si (KR); Seung Yeon Yang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 628 days.

(21) Appl. No.: 12/323,368

(22) Filed: Nov. 25, 2008

(65) Prior Publication Data

US 2009/0266328 A1    Oct. 29, 2009

(30) Foreign Application Priority Data

Apr. 23, 2008   (KR) ........................ 10-2008-0037716

(51) Int. Cl.
*F02M 35/10* (2006.01)
(52) U.S. Cl. .............................. 123/184.56; 123/184.53
(58) Field of Classification Search ............. 123/184.53, 123/184.56, 184.24–184.26, 184.34–184.36, 123/184.42–184.44, 184.47–184.49, 184.51
See application file for complete search history.

(56) References Cited

U.S. PATENT DOCUMENTS
5,492,093 A    2/1996   Rygiel

FOREIGN PATENT DOCUMENTS
KR        10-0820709 B1    4/2008

*Primary Examiner* — Noah Kamen
(74) *Attorney, Agent, or Firm* — Morgan, Lewis & Bockius LLP

(57) ABSTRACT

The present invention relates to an intake manifold for a vehicle and comprises tanks for stabilizing intaken air introduced from a throttle body; a plurality of zip tubes diverged from the tanks; a plurality of runners connected to the zip tubes and communicated with respective cylinders; and a adjustment apparatus provided at one side of the zip tubes and the runners for varying the diameter of the zip tube and the diameter of the runner according to an engine operation range. Due to the above structure, the diameter of the zip tube and the diameter of the runner can be varied continuously within the overall operating range of an engine by the adjustment apparatus. Hence, the performance of the engine can be enhanced.

18 Claims, 11 Drawing Sheets

INTAKE MANIFOLD FOR VEHICLE

CROSS-REFERENCE TO RELATED APPLICATIONS

This application claims priority from Korean Patent Application No. 10-2008-0037716 filed on 23 Apr., 2008, the contents of which are incorporated herein by reference in its entirety.

BACKGROUND OF THE INVENTION

The present invention relates to an intake manifold for a vehicle, more particularly, it relates to an intake manifold for a vehicle which can vary simultaneously and continuously the width of a runner and the width of a zip tube to enhance an engine performance in an overall operation region of an engine.

In general, an intake manifold for a vehicle is a line for supplying intaken air into a combustion chamber. In recent times, a variable intake system is provided in the intake manifold to allow a flowing distance of intaken air to be extended and a flowing passage for intaken air to be narrowed when the engine is operated with a low number of revolutions (RPM); and to allow a flowing distance of intaken air to be shortened and a flowing passage for intaken air to be enlarged when the engine is operated with a high number of revolutions.

That is, the amount of intaken air can be increased by utilizing an intake pulsation (load) and is influenced by the length and the width of an intake line. Accordingly, the intake line, having a short length and a large width is advantageous in a high-speed range since the intake line meets less resistance; and the intake line, having a long length and small width is advantageous in a low and mid-speed range since it is possible to use sufficiently the intake pulsation.

Consequently, if the intake line is divided into two lines and a valve is opened/closed by means of a negative pressure or a step motor and the like, it is possible to control optimally the intake manifold according to the number of revolutions of the engine so that a volume efficiency is increased.

A conventional example of the above intake manifold is shown in FIG. 10.

FIG. 10 is a partial-section perspective view of a conventional bank-separation type intake manifold 100. The conventional intake manifold 100 comprises of a zip tube 110 connected to a throttle body, a plenum chamber 120 communicated with the zip tube 110, and having a two-partitioned bank 122 formed therein and a plurality of runners 130 communicated with the plenum chamber 120 to supply intaken air to a combustion chamber of each cylinder.

At this time, a variable intake system valve 125 is provided in the plenum chamber 120. The variable intake system valve 125 is closed until the number of revolutions of the engine becomes approximately 4,000 rpm, so that two partitioned portions of the bank 122 are separated from each other to activate the an intake pulsation. In addition, if the number of revolutions of the engine is above 4,000 rpm, the variable intake system valve 125 is opened so that a great quantity of intaken air can be supplied into a combustion chamber by the sufficient use of the intake pulsation.

In other words, by providing the variable intake system valve 125, it is possible to eliminate the interference effect between two partitioned portions of the bank 122 or to maximize the interference effect to prevent a torque valley generated at the number of revolutions of approximately 3,000 rpm.

However, in regard to the conventional intake manifold 100 above, since the variable intake system valve 125 is opened or closed in two divided ranges of a low-mid speed range and in a high-speed range, the intake pulsation can not be optimized sufficiently in the overall operating range of the engine, limiting the optimal performance of the engine.

In order to solve the above problems, the present inventors have studied and invented an intake manifold which can vary the width of a runner and the width of a zip tube simultaneously and continuously, whereby an intake pulsation is sufficiently optimized within the overall operating range of an engine to enhance the performance of the engine.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Accordingly, an objective of the present invention in exemplary embodiments is to provide an intake manifold for a vehicle which can vary the width of a runner and the width of a zip tube simultaneously and continuously to enhance the performance of an engine within the overall operating range of the engine.

The above object is accomplished by the intake manifold for a vehicle according to an exemplary embodiment of the present invention that may comprise: tanks for stabilizing intaken air introduced from a throttle body; a plurality of zip tubes diverged from one of the tanks; a plurality of runners connected to the other tanks and communicated with respective cylinders; and a adjustment apparatus provided at one side of the zip tubes and the runners for varying the width of the zip tube and the width of the runner simultaneously according to an engine operation range.

The one of the tanks may be a center tank and the other tanks are main tanks, and each of the zip tubes is provided between the center tank and the respective main tank.

The main tanks may consist of a left main tank and a right main tank; the zip tubes consist of a left zip tube diverged from the center tank and connected to one end portion of the left main tank and a right zip tube diverged from the center tank and connected to one end portion of the right main tank; and the runners consist of a left runner connected to the other end portion of the left main tank and a right runner connected to the other end portion of the right main tank, wherein the left runner and the right runner extend inwards each other to be crossed at a location.

The adjustment apparatus may comprise: a zip valve provided at lower portion of the center tank and extends through the left and right zip tubes substantially to the left and right main tanks respectively for varying the widths of the left and right zip tube; a runner valve provided in the left and right runners and extends substantially to the left and right main tanks respectively for varying the widths of the left and right runner; and a driving unit for driving the left and right zip valves and the left and right runner valves.

The zip valve may comprise: a zip-rotational shaft coupled to the lower portion of the center tank; a left zip valve wherein one end of the left zip valve is coupled to the zip-rotational shaft, and the other end of the left zip valve extends substantially to the left main tank and rotatable about the zip-rotational shaft in the upward/downward directions for varying the width of the left zip tube; and a right zip valve wherein one end of the right zip valve is coupled to the zip-rotational shaft, and the other end of the right zip valve extends substantially to the right main tank and rotatable about the zip-rotational shaft in the upward/downward directions for varying the width of the right zip tube. The runner valve may comprise: a runner-rotational shaft provided on the location at which the left runner and the right runner cross each other; a left runner valve wherein one end of the left runner valve is coupled to the runner-rotational shaft and the other end of the left runner valve extends substantially to the left main tank and rotatable about the runner-rotational shaft in the upward/downward directions for varying the width of the left runner; and a right runner valve wherein one end of the right runner valve is coupled to the runner-rotational shaft and the other end of the right runner valve extends substantially to the right main tank and rotatable about the runner-rotational shaft in the upward/downward directions for varying the width of the right runner.

The driving unit may comprise; a left cam being rotated integrally with a left cam shaft for allowing the left cam to be in contact with the left zip valve and the left runner valve; a right cam being rotated integrally with a right cam shaft for allowing the right cam to be in contact with the right zip valve and the right runner valve; a left restoration member elastically supporting the left zip valve and the left runner valve to allow two portions of the left cam to be in contact with the zip valve and the left runner valve, respectively; and a right restoration member elastically supporting the right zip valve and the right runner valve to allow two portions of the right cam to be in contact with the right zip valve and the right runner valve, respectively. The left cam shaft and the right cam shaft may be disposed at centers of the left cam and right cam respectively. The left cam shaft and the right cam shaft may be disposed at portion offset from centers of the left cam and right cam with a predetermined distance respectively. The left cam shaft may have a left cam sprocket coupled thereto and the right cam shaft has a right cam sprocket coupled thereto, reverse gears are geared with the left cam sprocket and the right cam sprocket, respectively, and one of the right cam shaft and the left cam shaft is coupled to a motor.

The runner-rotational shaft may be formed in the shape of a hollow cylinder having at least an oil mist opening, and the runner-rotational shaft is lubricated by oil mist supplied from a positive crankcase ventilation valve through the at least an oil mist opening.

In another exemplary embodiment of the present invention, the adjustment apparatus may comprise: a zip valve formed in the shape of a plate having both side end portions bent downward and provided over the center tank, wherein both side end portions of the zip valve extends substantially to the main tanks for varying the width of the zip tube; a runner valve provided in the runner and extends substantially to the main tanks for varying the width of the runner; and a driving unit for driving the zip valve and the runner valve.

The runner valve may comprise: a runner-rotational shaft provided on the location at which the left runner and the right runner cross each other; a left runner valve wherein one end of the left runner valve is coupled to the runner-rotational shaft and the other end of the left runner valve extends substantially to the left main tank and rotatable about the runner-rotational shaft in the upward/downward directions for varying the width of the left runner; and a right runner valve wherein one end of the right runner valve is coupled to the runner-rotational shaft and the other end of the right runner valve extends substantially to the right main tank and rotatable about the runner-rotational shaft in the upward/downward directions for varying the width of the right runner.

The driving unit may comprise; a left cam being rotated integrally with a left cam shaft for allowing the left cam to be in contact with the zip valve and the left runner valve; a right cam being rotated integrally with a right cam shaft for allowing the right cam to be in contact with the zip valve and the right runner valve; a left restoration member elastically supporting the zip valve and the left runner valve to allow two portions of the left cam to be in contact with the zip valve and the left runner valve, respectively; and a right restoration member elastically supporting the zip valve and the right runner valve to allow two portions of the right cam to be in contact with the zip valve and the right runner valve, respectively.

The left cam shaft and the right cam shaft may be disposed at centers of the left cam and right cam respectively. The left cam shaft and the right cam shaft may be disposed at portion offset from centers of the left cam and right cam with a predetermined distance respectively.

The left cam shaft may have a left cam sprocket coupled thereto and the right cam shaft has a right cam sprocket coupled thereto, reverse gears are geared with the left cam sprocket and the right cam sprocket, respectively, and one of the right cam shaft and the left cam shaft is coupled to a motor.

The runner-rotational shaft may be formed in the shape of a hollow cylinder having at least an oil mist opening, and the runner-rotational shaft is lubricated by oil mist supplied from a positive crankcase ventilation valve through the at least an oil mist opening.

BRIEF DESCRIPTION OF THE DRAWINGS

The above, and other features and advantages of the present invention, will become readily apparent by reference to the following detailed description when considered in conjunction with the accompanying drawings wherein:

FIG. 1b is a plane view of FIG. 1a;

FIG. 2 is a perspective view showing a adjustment apparatus shown in FIG. 1a;

FIG. 9($b$) is a sectional view showing a profile of the cam for varying more largely the width of the zip tube than the width of the runner;

FIG. 9($c$) is a sectional view showing a profile of the cam for varying more largely a width of the runner than a width of the zip tube.

DESCRIPTION OF SPECIFIC EMBODIMENTS

Figure 1A:
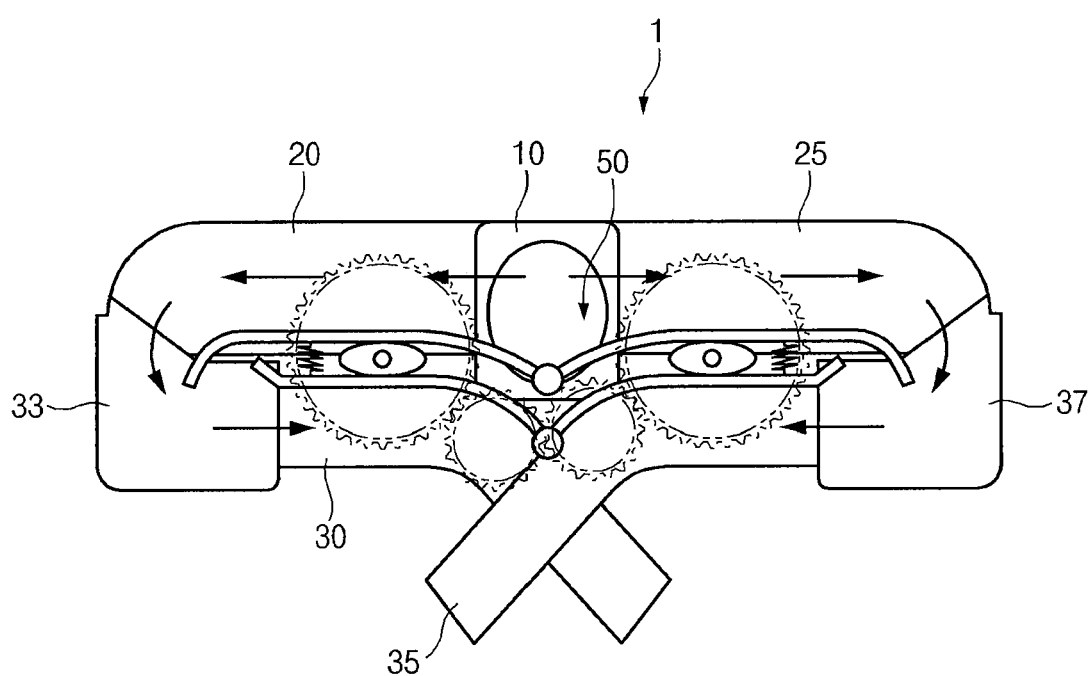
FIG. 1a is a side view showing an intake manifold of a vehicle according to the first embodiment of the present invention.

Hereinafter, an intake manifold for a vehicle according to the preferred embodiments of the present invention will be explained in more detail with reference to the accompanying drawings.

The typical first embodiment in various embodiments of the present invention is illustrated herein and the same reference numerals indicate the structural elements having the same structure. In addition, only the structures in other embodiments that differ from the corresponding structures in the first embodiment are illustrated.

Figure 1B:
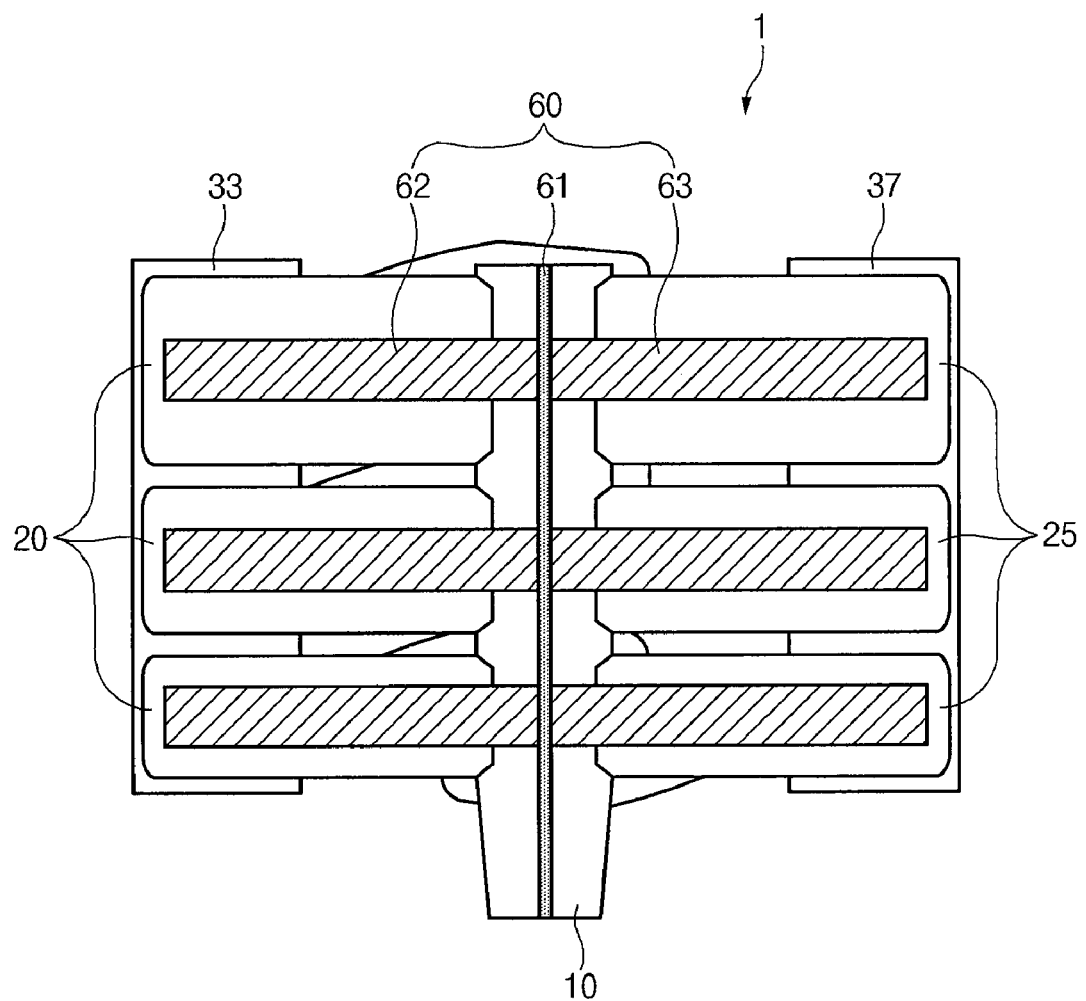

FIG. 1a is a side view showing an intake manifold of a vehicle according to the first embodiment of the present invention and FIG. 1b is a plane view of FIG. 1a. An intake manifold 1 for a vehicle according to the first embodiment of the present invention comprises tank 10, 33 and 37; a plurality of zip tubes 20 and 25 diverged from the tanks 10, 33 and 37; a plurality of runners 30 and 35 connected to the zip tubes 20 and 25, respectively, and communicated separately with respective cylinders of an engine; and a adjustment apparatus 50 for varying continuously the width of the zip tube and the width of the runner according to an engine operation range; a controller (not shown) controlling the adjustment apparatus 50.

The tanks consist of a center tank 10 connected to a throttle body and left and right main tanks 33 and 37. At this time, one zip tube 20 is located between the center tank 10 and the left main tank 33, and the other zip tube 25 is located between the center tank 10 and the right main tank 37.

The center tank 10 is one elongated passage in which intaken air introduced from the throttle body is flowed and stabilized.

The zip tubes consist of the left zip tube 20 diverged from the center tank 10 in the left direction and the right zip tube 25 diverged from the center tank 10 in the right direction. At this time, it will be apparent that the number of the left zip tube 20 and the number of the right zip tube 25 should correspond to the number of the cylinders. Here, it is preferable that each section of the zip tubes 20 and 25, in an area at which a zip valve 60 described later, is operated is a rectangular shape for allowing the zip valve 60 to be operated without interference.

The left main tank 33 is connected to a lower end of the left zip tube 20 and an upper end of the left runner 30 described later, and the right main tank 37 is connected to a lower end of the right zip tube 25 and an upper end of the right runner 35 described later.

The left main tank 33 is manufactured as one elongated passage for enabling intaken air to flow into a plurality of diverged left runners 30 to be mixed and stabilized. The left runners 30 are diverged from the left main tank 33.

The right main tank 37 is manufactured as one elongated passage for enabling intaken air to flow into a plurality of diverged right runners 35 to be mixed and stabilized. The right runners 35 are diverged from the right main tank 37.

The runners consist of the left runner 30 connected to a lower end of the left main tank 33 and disposed below the left zip tube 20, and the right runner 35 connected to a lower end of the right main tank 37 and disposed below the right zip tube 25. Here, it is preferable that each section of the runners 30 and 35, in an area at which a runner valve 70 (see FIG. 2), described later, is operated, is a rectangular shape for allowing the runner valve 70 to be operated without interference.

The number of the left runners 30 is the same as that of the cylinder. The left runners are diverged from the left main tank 33 and function to supply intaken air into respective cylinders. At this time, the left runner 30 has a shape such that the left runner is horizontally extended inward from the left main tank 33 to dispose the left runner 30 below the left zip tube 20, and the left runner 30 is then bent downward.

The number of the right runners 35 is the same as that of the cylinders. The right runners 35 are diverged from the right main tank 37 and function to supply intaken air into respective cylinders. At this time, the right runner 35 has a shape such that the right runner 35 is horizontally extended inward from the right main tank 37 to dispose the right runner below the right zip tube 25, and the right runner 35 is then bent downward, Thus, the right runner 35 crosses the left runner 30.

Figure 2:
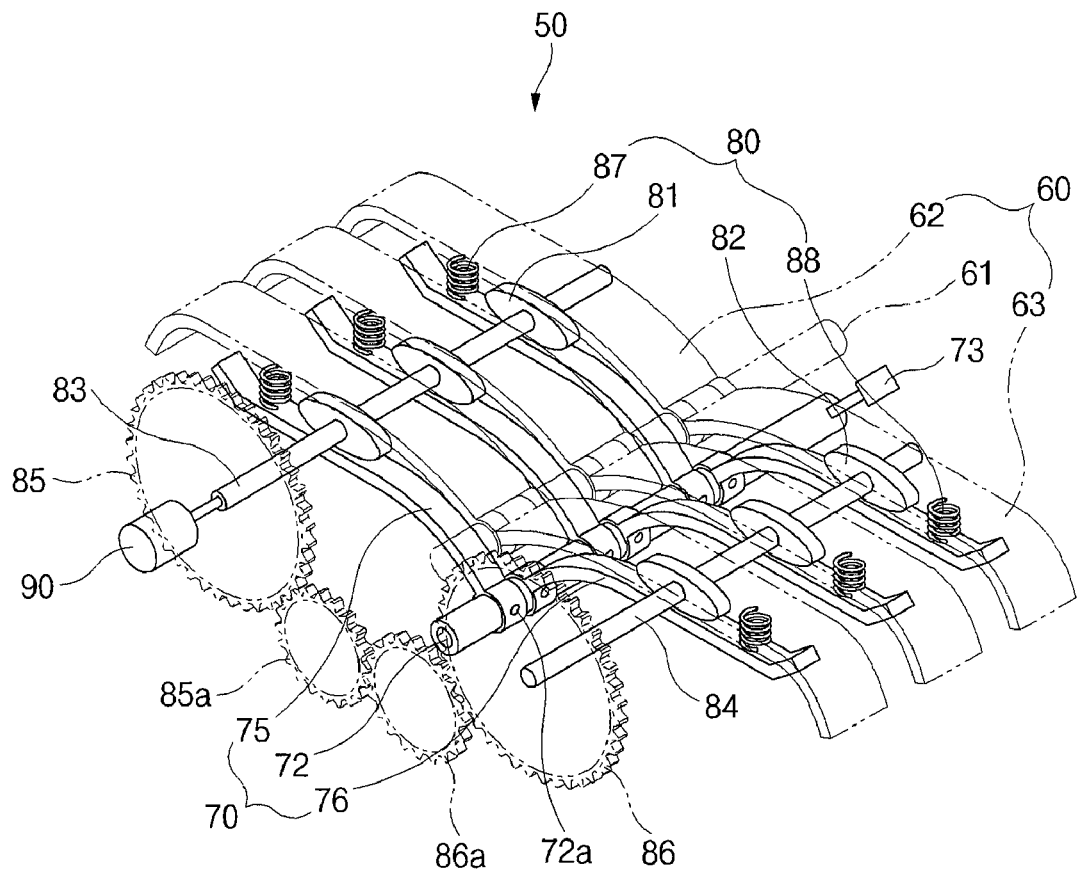

The adjustment apparatus 50 is the device provided at one side of the left and right zip tubes 20 and 25 and the left and right runners 30 and 35 for varying continuously the width of the zip tube and the width of the runner. As shown in FIG. 2, the adjustment apparatus 50 comprises the zip valve 60 for varying the width of the zip tube, the runner valve 70 for varying the width of the runner, and a driving unit 80 for driving the zip valve 60 and the runner valve 70.

The zip valve 60 consists of a zip-rotational shaft 61 supported by the center tank 10; a left zip valve 62 provided on the zip-rotational shaft 61 and rotatabe about the zip-rotational shaft 61 in the upward/downward directions for varying the width of the left zip tube 20; and a right zip valve 63 provided on the zip-rotational shaft 61 and rotatabe about the zip-rotational shaft 61 in the upward/downward directions for varying the width of the right zip tube 25.

The runner valve 70 consists of a runner-rotational shaft 72 provided on a location at which an upper surface of the left runner 30 and an upper surface of the right runner 35 cross each other; a left runner valve 75 provided rotatably about the runner-rotational shaft 72 in the upward/downward directions for varying the width of the left runner 30; and a right runner valve 76 provided rotatably about the runner-rotational shaft 72 in the upward/downward directions for varying the width of the right runner 35.

At this time, the zip valve 60 and the runner valve 70 are driven by the driving unit 80 to vary the width of the zip tube and the width of the runner, respectively. The driving unit 80 consists of a left cam 81 disposed between the left zip valve 62 and the left runner valve 75 and driving them; a right cam 82 disposed between the right zip valve 63 and the right runner valve 76 and driving them; a left restoration member 87 disposed between the left zip valve 62 and the left runner valve 75 and supporting elastically them for allowing both noses A, A' (see FIG. 3) of the left cam 81 to be in contact with the left zip valve 62 and the left runner valve 75, respectively; and a right restoration member 88 supporting elastically the right zip valve 63 and the right runner valve 76 for allowing both noses B, B' (see FIG. 3) of the right cam 82 to be in contact with the right zip valve 63 and the right runner valve 76, respectively.

The left cam 81 is placed between the left zip valve 62 and the left runner valve 75 and is rotated integrally with a left cam shaft 83. As a result, the left zip valve 62 is rotated about the zip-rotational shaft 61 and the left runner valve 75 is rotated about the runner-rotational shaft 72 according to a rotational angle of the left cam 81. Thus, the width of the left zip tube 20 and the width of the left runner 30 can be varied continuously.

The right cam 82 is placed between the right zip valve 63 and the right runner valve 76 and is rotated integrally with a right cam shaft 84. As a result, the right zip valve 63 is rotated about the zip-rotational shaft 61 and the right runner valve 76 is rotated about the runner-rotational shaft 72 according to a rotational angle of the right cam 82. Thus, the width of the right zip tube 25 and the width of the right runner 35 can be varied continuously.

At this time, the left cam shaft 83 and the right cam shaft 84 are driven by one motor 90. To transmit a driving force of the motor 90 to the cam shafts 83 and 84, a left cam sprocket 85 is coupled to the left cam shaft 83 and a right cam sprocket 86 is coupled to the right cam shat 84, and reverse gears 85a and 86a are geared with the left cam sprocket 85 and the right cam sprocket 86, respectively. In other words, since the left cam sprocket 85, the reverse gears 85a and 86a, and the right cam sprocket 86 are all geared with each other, there is an advantage in that the cam shafts 83 and 84 can be rotated by only one motor 90.

In the meantime, a positive crankcase ventilation valve 73 is coupled to the runner-rotational shaft 72 to reduce the frictional force generated when the left runner valve 75 and the right runner valve 76 are rotated. The hollow shaped runner-rotational shaft 72, having a plurality of oil mist openings 72a formed thereon, is provided to couple the positive crankcase ventilation valve 73 to the runner-rotational shaft 72. As a result, oil mist that flows into the positive crankcase ventilation valve 73 is discharged through the oil mist openings 72a so that friction areas between the runner-rotational shaft 72 and the left runner valve 75 and between the runner-rotational shaft 72 and the right runner valve 76 can be lubricated by oil mist.

An operation principle of the intake manifold 1 for a vehicle, according to the first embodiment of the present invention as constructed above, will be explained briefly with reference to FIG. 1a, FIG. 3 and FIG. 4.

Figure 3:
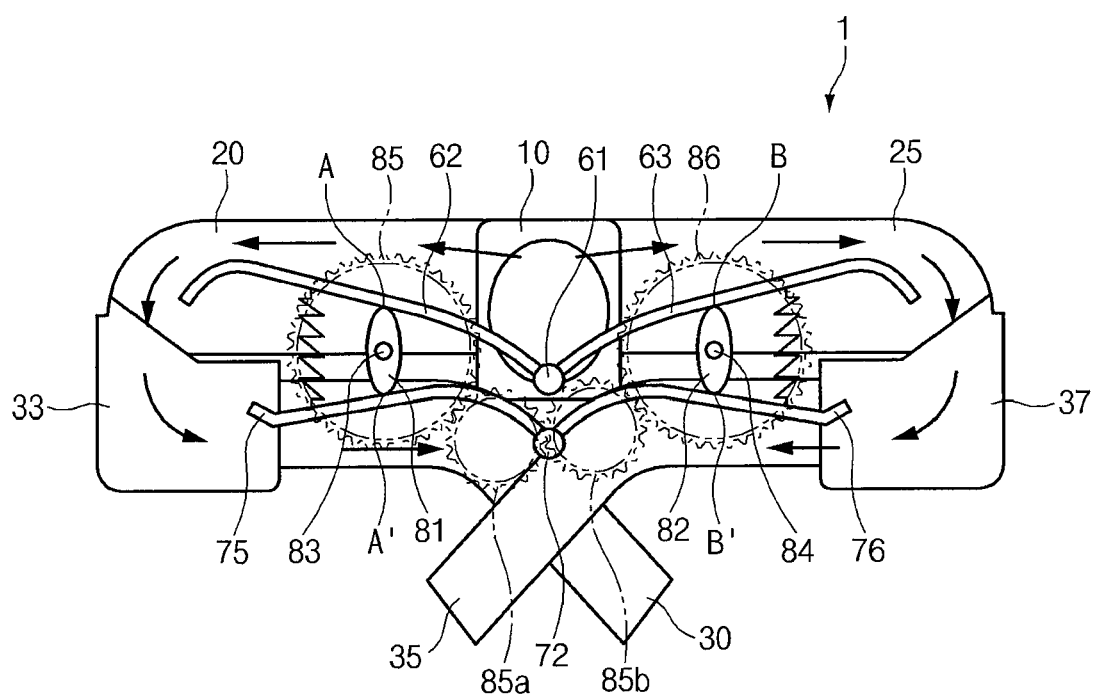
FIG. 3 is a side view showing an operating state of a adjustment apparatus shown in FIG. 2 in a state where an engine is operated in a low-speed range.
Figure 4:
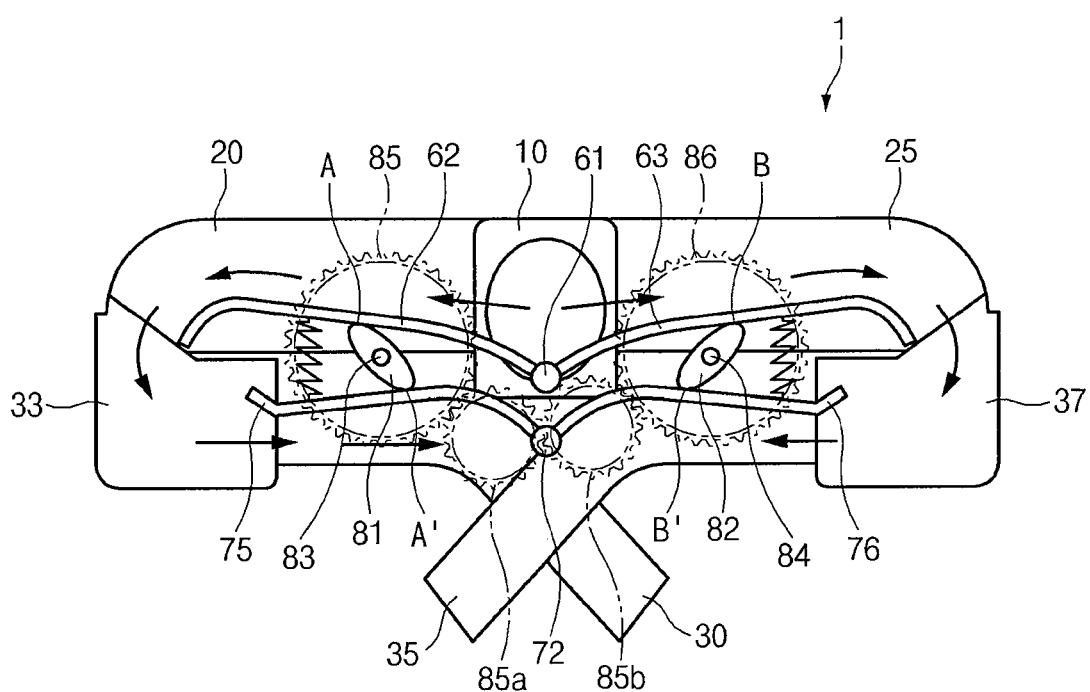
FIG. 4 is a side view showing an operating state of a adjustment apparatus shown in FIG. 2 in a state where an engine is operated in a mid-speed range.

First, in a case where the engine is operated within a low-speed range, the left cam 81 and the right cam 82 are vertically disposed as shown in FIG. 3. That is, the left cam 81 and the right cam 82 are rotated about 90° by means of the motor 90. Accordingly, the left and right zip valves 62 and 63 are rotated upward about the zip-rotational shaft 61, and the left and right runner valves 75 and 76 are rotated downward about the runner-rotational shaft 72 so that both noses A and A' of the left cam 81 are in maximum contact with the left zip valve 62 and the left runner valve 75, respectively, and both noses B and B' of the right cam 82 are in maximum contact with the right zip valve 63 and the right runner valve 76, respectively, As a result, the zip valve 60 and the runner valve 70 are pressurized maximally by the cams 81 and 82, and the width of the zip tube and the width of the runner are maximally reduced. Thus, the flow rate of intaken air is increased to promote the atomization of fuel. Consequently, it is possible to obtain the effect in that a capacity of the catalyst can be reduced.

On the other hand, if a driving status of the engine is changed from a low-speed range to a mid-speed range, an electronic control unit (hereinafter, referred to as "ECU") drives the motor 90 to vary a rotational angle of each of the left cam 81 and the right cam 82. As a result, an operating state of the adjustment apparatus 50 is changed into the state as shown in FIG. 4. From the state as shown in FIG. 3, in other words, the left cam 81 and the right cam 82 are rotated about 45° in one direction by the motor 90. Accordingly, as compared with a driving status in a low-speed range, the left and right zip valves 62 and 63 are rotated downward about the zip-rotational shaft 61 and the left and right runner valves 75 and 76 are rotated upward about the runner-rotational shaft 72 by a left restoration member 87 and a right restoration member 88. Due to the above condition, as compared with the engine operated within a low-speed range, when the engine is operated within a mid-speed range, the width of the zip tubes 20 and 25 and the width of the runners 30 and 35 are increased so that a sufficient amount of intaken air can be supplied into the combustion chamber.

Finally, if a driving status of the engine is changed from a mid-speed range to a high-speed range, the ECU drives the motor 90 to make a rotational angle of the left cam 81 and the right cam 82 to be about 0°. As a result, an operating state of the adjustment apparatus 50 is changed into the state as shown in FIG. 1a. From the state as shown in FIG. 4, in other words, the left cam 81 and the right cam 82 are rotated another 45° in one direction by the motor 90. Accordingly, as compared with a driving status in a mid-speed range, the left and right zip valves 62 and 63 are rotated maximally downward about the zip-rotational shaft 61 and the left and right runner valves 75 and 76 are rotated maximally upward about the runner-rotational shaft 72 by a left restoration member 87 and a right restoration member 88. Due to the above condition, when the engine is operated within a high-speed range, the width of the zip tubes 20 and 25 and the width of the runners 30 and 35 are maximally increased to minimize the resistance of intaken air so that the performance in a high-speed range can be enhanced.

FIG. 5 to FIG. 8 are views showing an intake manifold 201 according to the second embodiment of the present invention. Except the structure of a adjustment apparatus 250, an overall structure of the intake manifold, according to the second embodiment, is the same as that of the intake manifold 1, according to the first embodiment.

That is, the adjustment apparatus 50 of the first embodiment is constructed such that the left zip valve 62 and the right zip valve 63 are rotated about the zip-rotational shaft 61. In the second embodiment, however, the zip-rotational shaft 61 that is utilized in the first embodiment is not provided in the adjustment apparatus 250, and a zip valve 260 has a plate shape and traverses the center tank 10.

Here, the zip valve 260 in the second embodiment is formed in the shape of a plate having an opened low face with both side end portions bent downward. And so, the zip valve 260 has a "Π" shape in section.

On the other hand, a runner valve 270 has a structure which is the same as that disclosed in the first embodiment. In other words, the runner valve 270 consists of a runner-rotational shaft 272 provided on a location at which an upper surface of the left runner 30 and an upper surface of the right runner 35 cross each other; and a left runner valve 275 and a right runner valve 276 provided on the runner-rotational shaft 272 and rotatabe about the runner-rotational shaft 272 in the upward/downward directions to vary the width of the left runner 30 and the width of the right runner 35, respectively.

Here, the positive crankcase ventilation valve 73 is coupled to the runner-rotational shaft 272 to reduce the frictional force generated when the left runner valve 275 and the right runner valve 276 are rotated. The hollow shaped runner-rotational shaft 272, having a plurality of oil mist openings 272a formed thereon, is provided to couple the positive crankcase ventilation valve 73 to the runner-rotational shaft 272. As a result, oil mist that flows into the positive crankcase ventilation valve 73 is discharged through the oil mist openings 272a so that friction areas between the runner-rotational shaft 272 and the left runner valve 275, and between the runner-rotational shaft 272 and the right runner valve 276, can be lubricated by oil mist.

At this time, like the first embodiment, the zip valve 260 and the runner valve 270 are driven by the driving unit 80, and so the detailed description thereon is omitted.

Figure 5:
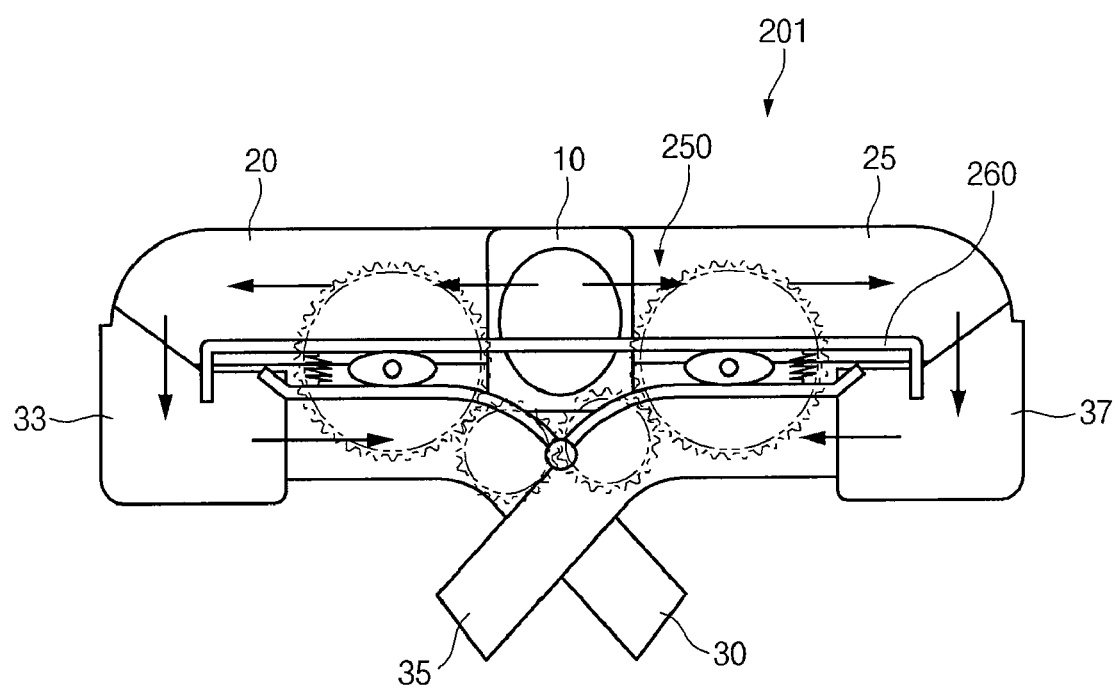
FIG. 5 is a side view showing an intake manifold of a vehicle according to the second embodiment of the present invention.
Figure 6:
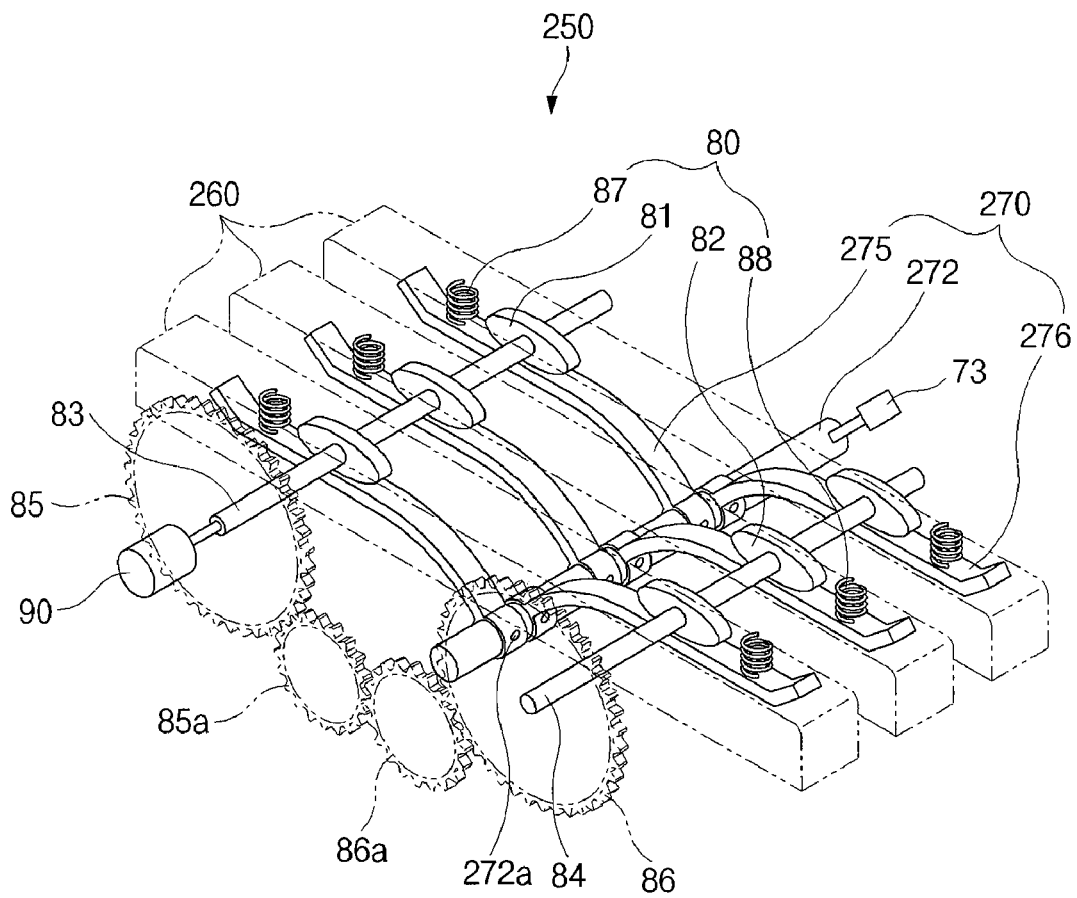
FIG. 6 is a perspective view showing a adjustment apparatus shown in FIG. 5.
Figure 7:
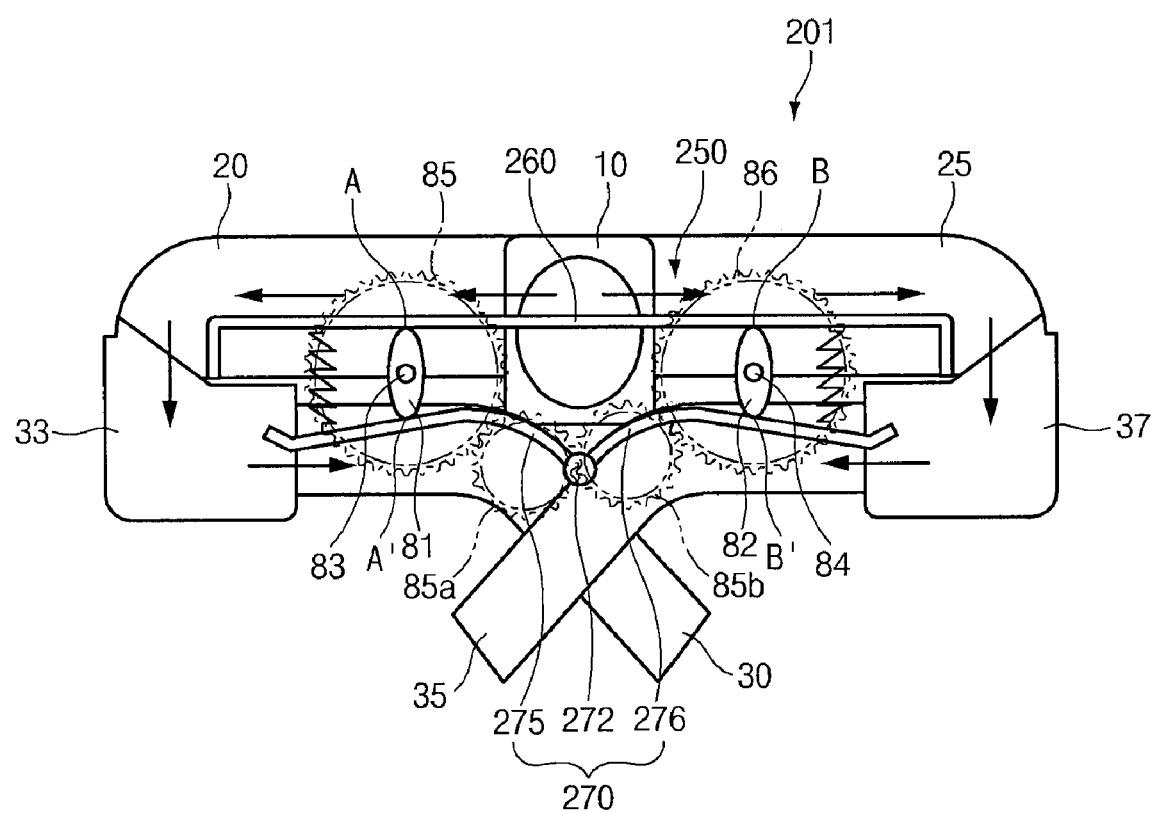
FIG. 7 is a side view showing an operating state of a adjustment apparatus shown in FIG. 6 in a state where an engine is operated in a low-speed range.
Figure 8:
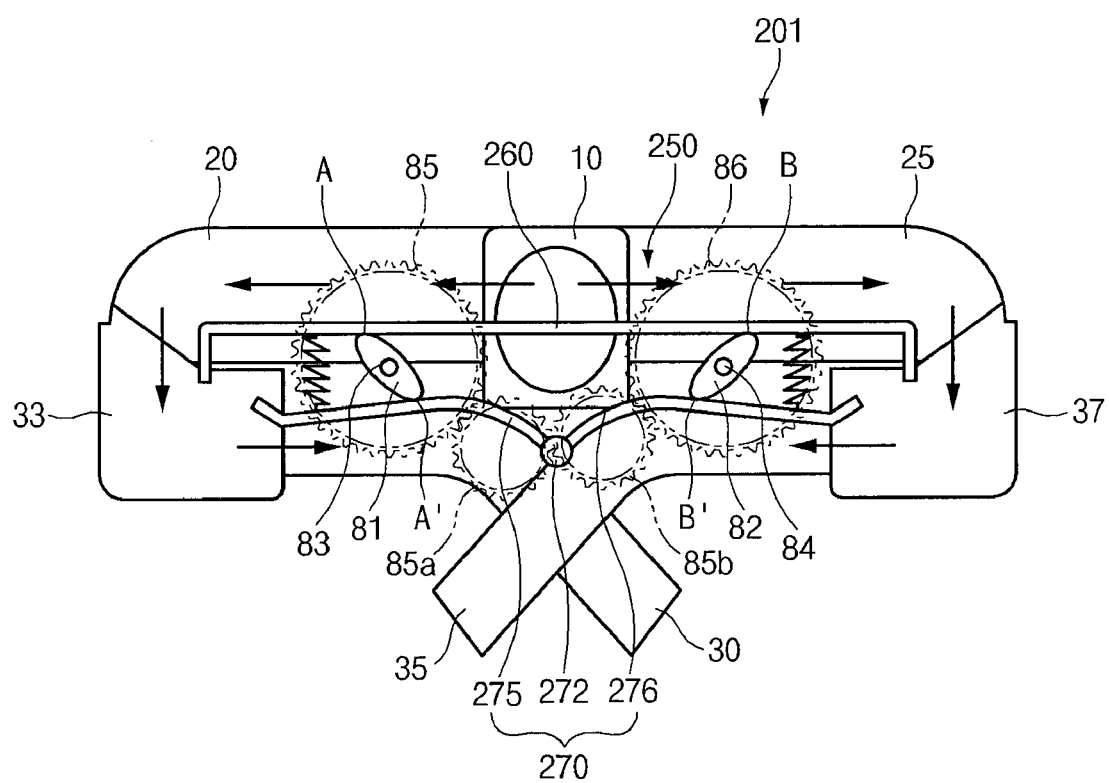
FIG. 8 is a side view showing an operating state of a adjustment apparatus shown in FIG. 6 in a state where an engine is operated in a mid-speed range.

In addition, FIG. 5 is a view showing an operating state of the adjustment apparatus 250 in a state where the engine is operated in a high-speed range, FIG. 7 is a side view showing an operating state of the adjustment apparatus 250 in a state where the engine is operated in a low-speed range. FIG. 8 is a side view showing an operating state of the adjustment apparatus 250 in a state where an engine is operated in a mid-speed range. The principle for varying the width of the zip tube and the width of the runner in the above states of the present embodiment is the same as that disclosed in the first embodiment. Hence, the description thereon is omitted.

In the meantime, the cams 81 and 82 of this embodiment have the shapes as shown in FIG. 9(a). In other words, since the cam shaft 83 (or 84) is disposed at a center of the cam 81 (or 82), both noses A and A' (or B and B') of the cam 81 (or 82) pressurizes the zip valve 60 (or 260) and the runner valve 70 (or 270) in the same ratio. And so the width of the zip tube and the width of the runner are varied at the same ratio.

However, the present invention is not limited to the above example. It will be apparent that a profile of the cam can be modified into those as shown in FIG. 9(b) and FIG. 9(c).

That is, unlike FIG. 9(a), in the structure as shown in FIG. 9(b), a cam shaft 383 (or 384) is eccentrically disposed at a lower portion below a center of a cam 381 (or 382). And so, the force exerted to the zip valve 60 (or 260) by an upper nose C (or D) of the cam 381 (or 382) differs in magnitude from that exerted to the runner valve 70 (or 270) by a lower nose C' (or D') of the cam 381 (or 382). In other words, since the distance between the cam shaft 383 (or 384) and the upper nose C (or D) of the cam 381 (or 382) is larger than that between the cam shaft 383 (or 384) and the lower nose C' (or D') of the cam 381 (or 382), the width of the zip tube can be more largely varied than the width of the runner.

Unlike FIG. 9(a), on the other hand, in the structure as shown in FIG. 9(c), a cam shaft 483 (or 484) is eccentrically disposed at an upper portion above a center of a cam 481 (or 482). And so, the force exerted to the zip valve 60 (or 260) by an upper nose E (or F) of the cam 481 (or 482) differs in magnitude from that exerted to the runner valve 70 (or 270) by a lower nose E' (or F') of the cam 481 (or 482). In other words, since a distance between the cam shaft 483 (or 484) and the lower nose E' (or F') of the cam 481 (or 482) is larger than that between the cam shaft 483 (or 484) and the upper nose E (or F) of the cam 481 (or 482), the width of the runner can be more largely varied than the width of the zip tube.

According to the present invention as described above, the width of the zip tube and the width of the runner can be varied continuously by the adjustment apparatus 50 or 250 according to an engine operation range. Hence, the engine performance can be enhanced in the overall operation range.

In the above embodiments, although the structure in which the two banks is explained as an example, the present invention is applicable to the structure in which a single bank is provided.

Although the aforementioned embodiments disclose the intake manifold applied to the six-cylinder engine, the present invention is not limited thereto, and it will be apparent that the intake manifold of the present invention can be applied to the four-cylinder engine, the eight-cylinder engine and the like.

In the aforementioned embodiments, as the left restoration member and the right restoration member are provided by a coil spring. However, the present invention is not limited thereto, and any member capable of providing an elastic force, including a plate spring and the like, can be utilized as the left and right restoration members.

Although the aforementioned embodiments disclose that the motor is coupled to a shaft of the left cam, it will be apparent that the motor is instead coupled to a shaft of the right cam.

Figure 9:
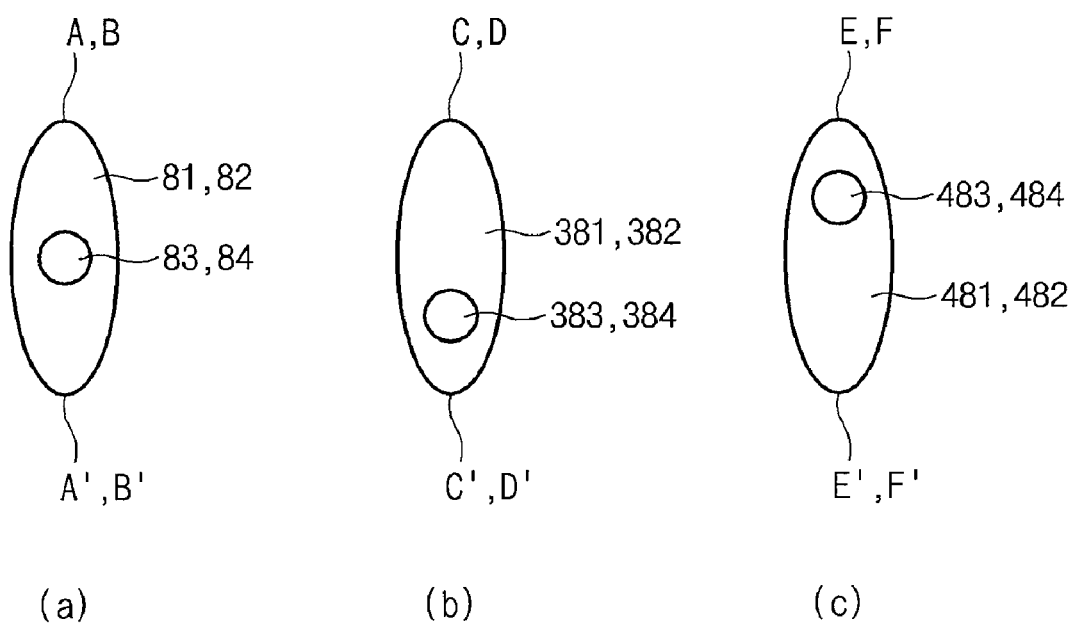
FIG. 9($a$) is a sectional view showing the shape of the cam applied to the first and second embodiments, and showing a profile of the cam enabling the width of the runner and the width of the zip tube to vary at the same ratio.
Figure 10:
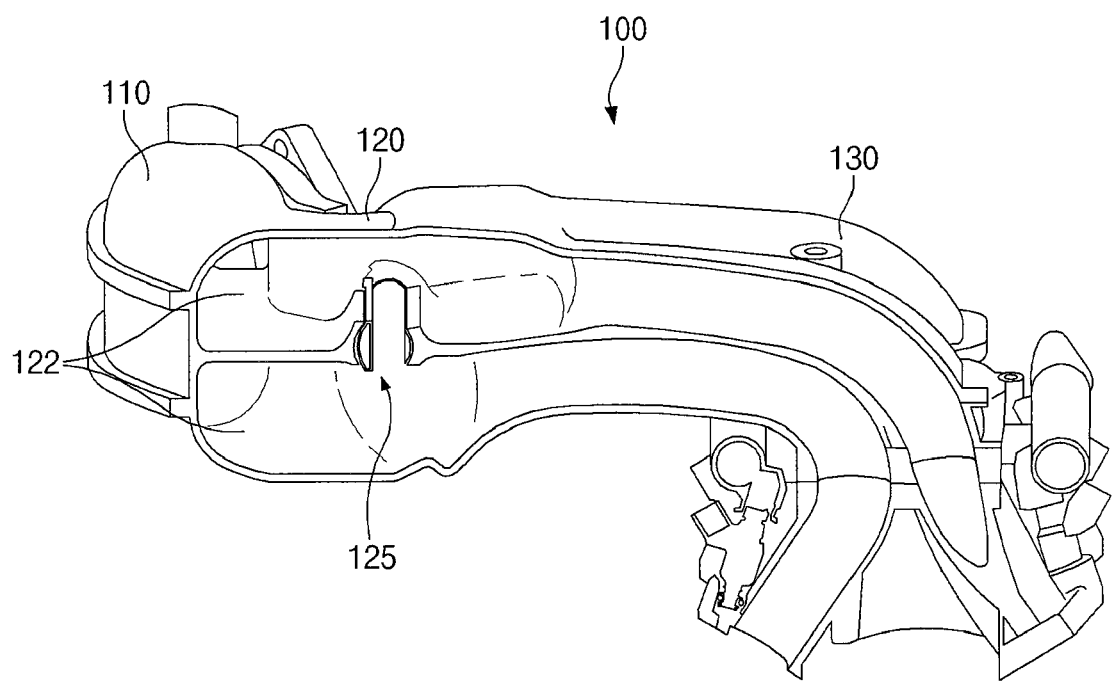
FIG. 10 is a partial section perspective view of a conventional intake manifold for a vehicle.

The profile of the cam in the present invention is not limited to the configurations of the cam shown in FIG. 9, and it will be apparent that the profile of the cam be modified, if necessary.

According to the present invention as described above, the width of the zip tube and the width of the runner can be varied continuously by the adjustment apparatus according to an engine operation range. Hence, the intake manifold, which is capable of enhancing an engine performance in the overall operation range, is provided.

In addition, a torque valley within a range of 3,000 rpm is eliminated by a separation of the bank, so that a performance of the engine in a mid-speed range can be more enhanced.

On the other hand, since the positive crankcase ventilation valve is coupled to the rotational shaft to lubricate the rotational shaft by utilizing oil mist that flows into the positive crankcase ventilation valve, an additional lubricating device is not required. Thus, there is an advantage in that the manufacturing cost for the intake manifold can be reduced.

Although the embodiments have been described with reference to a number of illustrative embodiments thereof, it should be understood that numerous other modifications and embodiments can be devised by those skilled in the art that will fall within the spirit and scope of the principles of this disclosure. More particularly, variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An intake manifold for a vehicle, comprising:
   tanks for stabilizing intaken air introduced from a throttle body;
   a plurality of zip tubes diverged from one of the tanks;
   a plurality of runners connected to the other tanks and coupled to respective cylinders; and
   a adjustment apparatus provided at one side of the zip tubes and the runners for varying the width of the zip tube and the width of the runner simultaneously according to an engine operation range,
   wherein the one of the tanks is a center tank and the other tanks are main tanks, and each of the zip tubes is provided between the center tank and the respective main tank.

2. The intake manifold for a vehicle of claim 1, wherein
   the main tanks consist of a left main tank and a right main tank;
   the zip tubes consist of a left zip tube diverged from the center tank and connected to one end portion of the left main tank and a right zip tube diverged from the center tank and connected to one end portion of the right main tank; and
   the runners consist of a left runner connected to the other end portion of the left main tank and a right runner connected to the other end portion of the right main tank, wherein the left runner and the right runner extend inwards each other to be crossed at a location.

3. The intake manifold for a vehicle of claim 2, wherein the adjustment apparatus comprises:
   a zip valve provided at lower portion of the center tank and extends through the left and right zip tubes substantially to the left and right main tanks respectively for varying the widths of the left and right zip tube;

a runner valve provided in the left and right runners and extends substantially to the left and right main tanks respectively for varying the widths of the left and right runner; and a driving unit for driving the left and right zip valves and the left and right runner valves.

4. The intake manifold for a vehicle of claim 3, wherein the zip valve comprises:

a zip-rotational shaft coupled to the lower portion of the center tank;

a left zip valve wherein one end of the left zip valve is coupled to the zip-rotational shaft, and the other end of the left zip valve extends substantially to the left main tank and rotatable about the zip-rotational shaft in the upward/downward directions for varying the width of the left zip tube; and a right zip valve wherein one end of the right zip valve is coupled to the zip-rotational shaft, and the other end of the right zip valve extends substantially to the right main tank and rotatable about the zip-rotational shaft in the upward/downward directions for varying the width of the right zip tube.

5. The intake manifold for a vehicle of claim 3, wherein the runner valve comprises:

a runner-rotational shaft provided on the location at which the left runner and the right runner cross each other;

a left runner valve wherein one end of the left runner valve is coupled to the runner-rotational shaft and the other end of the left runner valve extends substantially to the left main tank and rotatable about the runner-rotational shaft in the upward/downward directions for varying the width of the left runner; and a right runner valve wherein one end of the right runner valve is coupled to the runner-rotational shaft and the other end of the right runner valve extends substantially to the right main tank and rotatable about the runner-rotational shaft in the upward/downward directions for varying the width of the right runner.

6. The intake manifold for a vehicle of claim 5, wherein the driving unit comprises;

a left cam being rotated integrally with a left cam shaft for allowing the left cam to be in contact with the left zip valve and the left runner valve;

a right cam being rotated integrally with a right cam shaft for allowing the right cam to be in contact with the right zip valve and the right runner valve;

a left restoration member elastically supporting the left zip valve and the left runner valve to allow two portions of the left cam to be in contact with the zip valve and the left runner valve, respectively; and a right restoration member elastically supporting the right zip valve and the right runner valve to allow two portions of the right cam to be in contact with the right zip valve and the right runner valve, respectively.

7. The intake manifold for a vehicle of claim 6, wherein the left cam shaft and the right cam shaft are disposed at centers of the left cam and right cam respectively.

8. The intake manifold for a vehicle of claim 6, wherein the left cam shaft and the right cam shaft are disposed at portion offset from centers of the left cam and right cam with a predetermined distance respectively.

9. The intake manifold for a vehicle of claim 6, wherein the left cam shaft has a left cam sprocket coupled thereto and the right cam shaft has a right cam sprocket coupled thereto, reverse gears are geared with the left cam sprocket and the right cam sprocket, respectively, and one of the right cam shaft and the left cam shaft is coupled to a motor.

10. The intake manifold for a vehicle of claim 5, wherein the runner-rotational shaft is formed in the shape of a hollow cylinder having at least an oil mist opening, and the runner-rotational shaft is lubricated by oil mist supplied from a positive crankcase ventilation valve through the at least an oil mist opening.

11. The intake manifold for a vehicle of claim 2, wherein the adjustment apparatus comprises:

a zip valve formed in the shape of a plate having both side end portions bent downward and provided over the center tank, wherein both side end portions of the zip valve extends substantially to the main tanks for varying the width of the zip tube;

a runner valve provided in the runner and extends substantially to the main tanks for varying the width of the runner; and a driving unit for driving the zip valve and the runner valve.

12. The intake manifold for a vehicle of claim 11, wherein the runner valve comprises:

a runner-rotational shaft provided on the location at which the left runner and the right runner cross each other:

a left runner valve wherein one end of the left runner valve is coupled to the runner-rotational shaft and the other end of the left runner valve extends substantially to the left main tank and rotatable about the runner-rotational shaft in the upward/downward directions for varying the width of the left runner; and a right runner valve wherein one end of the right runner valve is coupled to the runner-rotational shaft and the other end of the right runner valve extends substantially to the right main tank and rotatable about the runner-rotational shaft in the upward/downward directions for varying the width of the right runner.

13. The intake manifold for a vehicle of claim 12, wherein the driving unit comprises;

a left cam being rotated integrally with a left cam shaft for allowing the left cam to be in contact with the zip valve and the left runner valve;

a right cam being rotated integrally with a right cam shaft for allowing the right cam to be in contact with the zip valve and the right runner valve;

a left restoration member elastically supporting the zip valve and the left runner valve to allow two portions of the left cam to be in contact with the zip valve and the left runner valve, respectively; and a right restoration member elastically supporting the zip valve and the right runner valve to allow two portions of the right cam to be in contact with the zip valve and the right runner valve, respectively.

14. The intake manifold for a vehicle of claim 13, wherein the left cam shaft and the right cam shaft are disposed at centers of the left cam and right cam respectively.

15. The intake manifold for a vehicle of claim 13, wherein the left cam shaft and the right cam shaft are disposed at portion offset from centers of the left cam and right cam with a predetermined distance respectively.

16. The intake manifold for a vehicle of claim 13, wherein the left cam shaft has a left cam sprocket coupled thereto and the right cam shaft has a right cam sprocket coupled thereto, reverse gears are geared with the left cam sprocket and the right cam sprocket, respectively, and one of the right cam shaft and the left cam shaft is coupled to a motor.

17. The intake manifold for a vehicle of claim 12, wherein the runner-rotational shaft is formed in the shape of a hollow cylinder having at least an oil mist opening, and the runner-rotational shaft is lubricated by oil mist supplied from a positive crankcase ventilation valve through the at least an oil mist opening.

18. An intake manifold for a vehicle, comprising:
- tanks for stabilizing intaken air introduced from a throttle body;
- a plurality of zip tubes diverged from one of the tanks;
- a plurality of runners connected to the other tanks and coupled to respective cylinders; and
- a adjustment apparatus provided at one side of the zip tubes and the runners for varying the width of the zip tube and the width of the runner simultaneously according to an engine operation range;
- a controller controlling the adjustment apparatus to vary the width of the zip tube and the width of the runner simultaneously according to an engine operation range.

* * * * *